(12) United States Patent
Unterlander et al.

(10) Patent No.: US 7,264,464 B2
(45) Date of Patent: Sep. 4, 2007

(54) COOLING TUBE WITH A LOW FRICTION COATING

(75) Inventors: Richard Matthias Unterlander, Nobleton (CA); Witold Neter, Newnan, GA (US); Tomasz Uracz, Everett (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 285 days.

(21) Appl. No.: 10/457,268

(22) Filed: Jun. 9, 2003

(65) Prior Publication Data
US 2004/0247734 A1    Dec. 9, 2004

(51) Int. Cl.
    *B29C 49/64*    (2006.01)
(52) U.S. Cl. .................. 425/445; 425/547; 425/526
(58) Field of Classification Search .......... 425/547, 425/526, 445; B29C 49/64
    See application file for complete search history.

(56) References Cited

U.S. PATENT DOCUMENTS

| | | | |
|---|---|---|---|
| 3,931,381 A | | 1/1976 | Lindberg |
| 4,102,626 A | * | 7/1978 | Scharrenbroich ........... 425/526 |
| 4,246,225 A | | 1/1981 | Ninneman |
| 4,380,526 A | | 4/1983 | Agrawal |
| 4,472,131 A | * | 9/1984 | Ryder ........................ 425/548 |
| 4,665,969 A | * | 5/1987 | Horst et al. ................. 164/439 |
| 4,729,732 A | * | 3/1988 | Schad et al. ................ 425/526 |
| RE33,237 E | | 6/1990 | Delfer, III |
| 5,079,299 A | * | 1/1992 | Hisamoto et al. ........... 525/100 |
| 5,198,176 A | | 3/1993 | Fortin |
| 5,325,732 A | | 7/1994 | Vogel |
| 5,447,426 A | * | 9/1995 | Gessner et al. ......... 425/436 R |
| 5,510,407 A | * | 4/1996 | Yamana et al. ............. 524/269 |
| 5,582,788 A | * | 12/1996 | Collette et al. .......... 264/297.2 |
| 5,837,299 A | * | 11/1998 | Bright et al. ................ 425/526 |
| 6,139,789 A | * | 10/2000 | Neter et al. ................. 264/535 |
| 6,143,225 A | | 11/2000 | Domodossola et al. |
| 6,171,541 B1 | * | 1/2001 | Neter et al. ............ 264/328.14 |
| 6,176,700 B1 | * | 1/2001 | Gellert ........................ 425/547 |
| 6,190,157 B1 | | 2/2001 | Hofstetter et al. |
| 6,332,770 B1 | * | 12/2001 | Oueslati et al. ............. 425/547 |
| 6,334,768 B1 | | 1/2002 | Looije et al. |
| 6,382,954 B1 | | 5/2002 | Mai |
| 6,447,704 B1 | | 9/2002 | Covino |
| 6,461,556 B1 | | 10/2002 | Neter |
| 6,464,919 B2 | * | 10/2002 | Dubuis et al. .............. 264/237 |
| 6,475,415 B1 | * | 11/2002 | Neter et al. ................. 264/40.6 |
| RE38,396 E | * | 1/2004 | Gellert ........................ 29/411 |
| 6,692,684 B1 | * | 2/2004 | Nantin et al. ............... 264/521 |
| 6,737,007 B2 | * | 5/2004 | Neter et al. ................. 264/538 |
| 6,770,239 B2 | * | 8/2004 | Oueslati et al. ............. 264/538 |

(Continued)

FOREIGN PATENT DOCUMENTS

WO    WO 2004/026561 A2    4/2004

OTHER PUBLICATIONS

See Printout of Webster Online Dictionary.*

(Continued)

*Primary Examiner*—Robert B. Davis
*Assistant Examiner*—G. Nagesh Rao (57) ABSTRACT

An intimate fit preform cooling tube with an inner mating surface that includes a polymeric coating to increase its lubricity and thereby reduce friction with a preform to be engaged therewith. The cooling tube of the present invention substantially reduces or eliminates preform ovality and gate stretching problems.

45 Claims, 5 Drawing Sheets

U.S. PATENT DOCUMENTS

| | | | |
|---|---|---|---|
| 6,802,705 B2* | 10/2004 | Brand et al. | 425/547 |
| 6,811,389 B1* | 11/2004 | Guiffant et al. | 425/526 |
| 6,848,900 B2* | 2/2005 | Romanski et al. | 425/526 |
| 6,896,943 B1 | 5/2005 | Beale | |
| 6,916,168 B2* | 7/2005 | Romanski et al. | 425/547 |
| 2001/0028930 A1* | 10/2001 | Koch et al. | 428/35.7 |
| 2002/0028265 A1* | 3/2002 | Oueslati et al. | 425/547 |
| 2002/0053760 A1* | 5/2002 | Boyd et al. | 264/532 |
| 2002/0074687 A1* | 6/2002 | Neter et al. | 264/237 |
| 2002/0079620 A1* | 6/2002 | Dubuis et al. | 264/328.14 |
| 2002/0081347 A1* | 6/2002 | Dubuis et al. | 425/547 |
| 2003/0108638 A1* | 6/2003 | Neter et al. | 425/547 |
| 2004/0056385 A1* | 3/2004 | Neter et al. | 264/328.14 |
| 2004/0058030 A1* | 3/2004 | Romanski et al. | 425/547 |
| 2004/0094869 A1* | 5/2004 | Zoppas et al. | 264/336 |
| 2004/0115302 A1* | 6/2004 | Rommes et al. | 425/526 |
| 2004/0185136 A1* | 9/2004 | Domodossola et al. | 425/547 |
| 2004/0258791 A1* | 12/2004 | Neter et al. | 425/546 |
| 2005/0042324 A1* | 2/2005 | Unterlander et al. | 425/547 |
| 2005/0046085 A1* | 3/2005 | Voth et al. | 264/346 |
| 2005/0136149 A1* | 6/2005 | Krishnakumar et al. | 425/526 |
| 2005/0147712 A1* | 7/2005 | Pesavento | 425/533 |

OTHER PUBLICATIONS

International Search Report for PCT/CA2004/000412, Jun. 23, 2004, pp. 1 and 2.

* cited by examiner

COOLING TUBE WITH A LOW FRICTION COATING

BACKGROUND OF INVENTION

1. Field of the Invention

The present invention relates to a receiving and conditioning apparatus for a molded article. Particularly, but not exclusively, the present invention relates to an improved cooling tube for receiving and conditioning a thermoplastic preform.

2. Background Information

Figure 1:
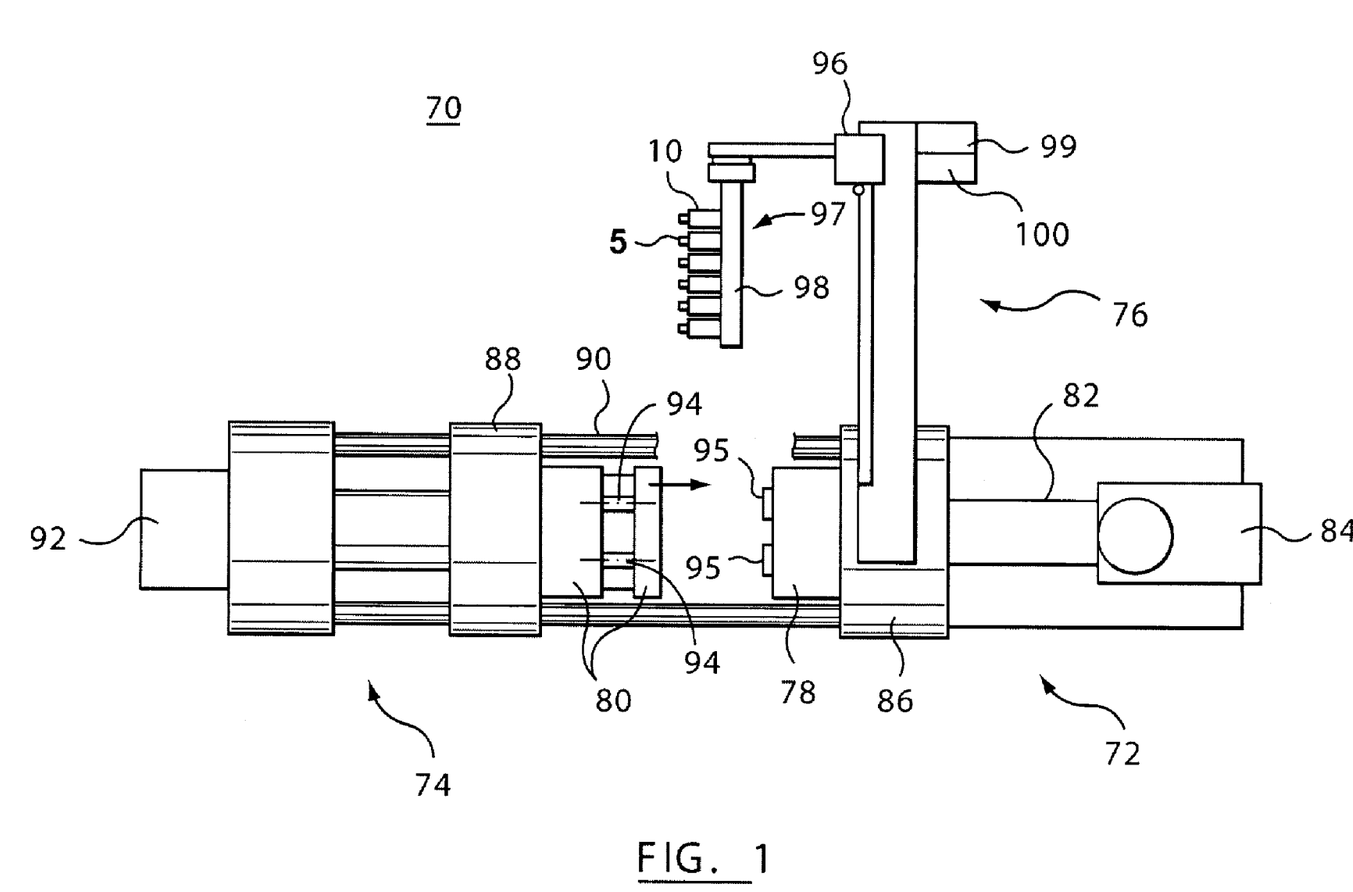
FIG. 1 illustrates a plan view of a typical injection molding system in which a cooling tube in accordance with an embodiment of the invention may be used.

The cooling tube of the present invention may be used in conjunction with a typical injection molding system 70, as shown in FIG. 1. The injection molding system 70 comprises an injection unit 72, a mold clamp unit 74, and a molded article handling and conditioning system 86. Alternatively, the injection molding system 70 could be an INDEX, a registered trademark of Husky Injection Molding Systems Limited, system as is generally described in commonly assigned U.S. Pat. No. 6,143,225 and co-pending application Ser. No. 10/351,596, or an injection stretch blow molding system such as described in U.S. Pat. No. 6,334,768.

The injection unit 72 provides, in use, a controlled flow of pressurized molten plastic into the closed and clamped injection mold 78 and 80 in a known manner. Typically, the injection unit 72 includes a barrel assembly 82, operable such that plastic resin entering the barrel assembly at the feed throat (not shown) is heated and pressurized by a rotating screw (not shown), with supplemental heat provided by barrel heaters (not shown). The melt is thereafter injected through a nozzle (not shown) into an adjacent injection mold 78 and 80 by reciprocation of the screw. The screw is rotated and typically reciprocated by a screw drive 84.

The clamp unit 74 provides, in use, a means to operate the injection mold between an open, closed and clamped position. The clamp unit includes a fixed platen 86 with a first mold half 78 mounted thereon and a movable platen 88 with the second mold half 80 mounted thereon. The moving platen 88 is operable to move the second mold half 80 between the mold open, mold closed and clamped positions by means of stroke cylinders (not shown) or the like. A mold clamping force required during injection is provided by a clamping means that includes tie bars 90 and a clamping mechanism 92 which generates a mold clamp force in a known manner. The first mold half 78 typically includes a runner system (not shown), such as a hot runner as commonly known, operable to distribute a flow of resin material received from the injection unit 72 to each of the mold cavities 94 and 95 defined between the mold halves 78 and 80 respectively.

The preform handling and conditioning system 76 includes a robot 96 that carries an end-of-arm tool 97. The end-of-arm tool 97 typically includes a carrier plate 98 with a set of cooling tubes 10 configured in an array thereon, as for example described in U.S. Pat. RE 33,237, for handling and conditioning of the molded preforms 5. The cooling tubes 10 are preferably connected through the carrier plate 98 and robot 96 to a suction source 99 and to a cooling source 100, for purposes to be described hereinafter.

Figure 2:
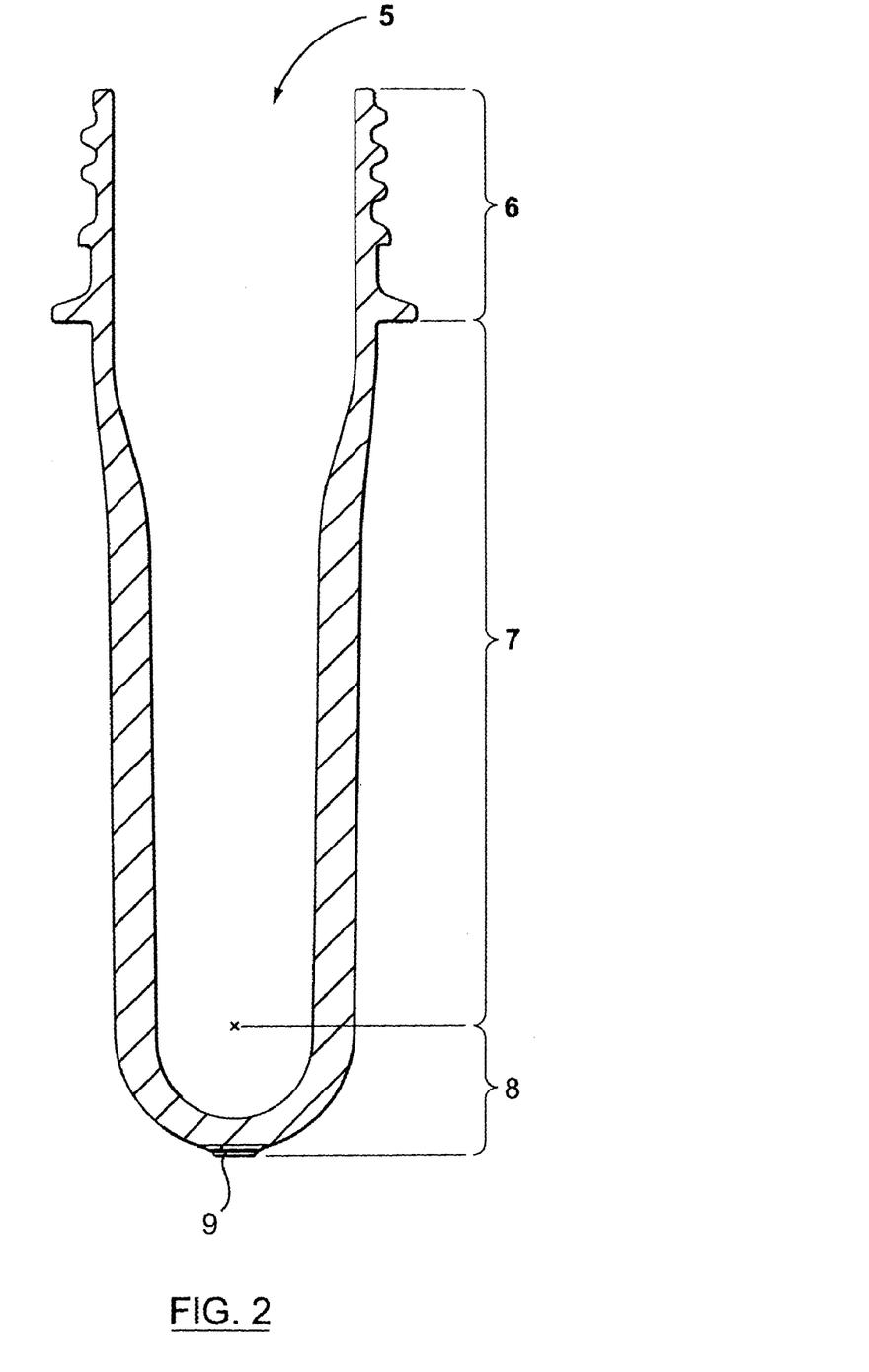
FIG. 2 illustrates a section view through an exemplary preform.

A typical preform 5, as shown in FIG. 2, includes, not exclusively, a neck portion 6 at a first end, a end portion 8 at the opposite closed end and a body portion 7 between the neck portion 6 and the end portion 8. The preform 5 typically includes a gate vestige 9 on the end portion 8. The end portion 8 is also commonly known as the gate area. The end portion 8 is commonly hemispherical in shape, although it may be any shape, including a substantially flat bottom. Preforms 5 are an intermediate product that are subsequently blow molded into a packaging article, typically a bottle.

The construction and operation of cooling tubes is very well known, there being a myriad of alternative constructions. For example, the cooling tube may be as described in commonly assigned co-pending application Ser. No. 10/321,940 that comprises an extruded cylindrically shaped tube with an inner mating surface for receiving a preform and a cooling means provided by cooling channels arranged within the wall of a tube body. It is however generally possible to classify the known cooling tubes into one of two groups that are divided on the basis of whether or not the cooling tube provides an intimate fit to the preform retained therein. Some of the limitations associated with these cooling tubes relate to the imparting of unwanted preform quality problems such as ovality and gate stretching.

Preform ovality relates to the deformation of the preform body portion 7 wherein the body portion 7 assumes an irregular (generally oval) shape. The ovality occurs whenever the preform body portion 7 loses intimate contact with the inner mating surface of the cooling tube 10, with a resulting loss in cooling efficiency, and when the preform body portion 7 retains enough heat to cause its surface temperature to increase in excess of the thermoplastic glass transition temperature. As a result of the skin reheating effect, and the softened preform 5 thereafter deforms due to uneven shrinkage. The skin reheating effect is a direct result of the poor thermal conductivity of typical preform thermoplastic polymers, such as polyethyleneterephthalate (PET), and the slow migration of heat from the relatively hot interior of a preform towards its surface.

As the name implies, gate stretching relates to unwanted stretching of the end portion 8 of the preform. Gate stretching typically occurs whenever the surface of the preform end portion 8 has had an opportunity to reheat past the thermoplastic glass transition temperature, as a result of the skin reheating effect, and is deformed under the applied suction from the cooling tube suction means.

The construction and operation of an intimate fit cooling tube is described in U.S. Pat. No. 4,729,732. The cooling tube comprises a cooled hollow tube and a mechanism for drawing the preform 5 progressively into the cooling tube as the preform 5 cools. The intimate fit aspect of the cooling tube describes the interference that occurs between the outer body shape 6 and 8 of the just-molded, and therefore hot, preform and a substantially correspondingly shaped but slightly inwardly offset inner mating or contact surface provided by the inner wall of the cooling tube such that the just-molded preform cannot immediately fit completely therein. The intimate fit aspect characterized another way provides that the inner mating surface of the cooling tube includes an applied shrinkage relative to the actual molding shape of the molding cavity. In use, the cooled cooling tube receives the just-molded preform into a first position wherein the preform body is in contact with the cooling tube mating surface but where a gap exists between the domed end-portion 8 of the preform and the correspondingly-shaped end surface of the cooling tube inner mating surface. As the preform begins both to cool and shrink, the preform consequently slides further along the inner mating surface of (and further into) the tube until the preform is completely seated in the cooling tube and the end portion 8 is in contact with the correspondingly shaped end surface of the cooling tube.

Accordingly, the advantage provided by an intimate fit cooling tube is relatively efficient and uniform preform body portion 7 cooling with fewer preform quality problems and reduced molding cycle time (i.e. reduced in-mold cooling requirement).

A challenge with the intimate fit cooling tube is the avoidance of gate stretching. Therefore, the establishment of the offset of the cooling tube inner mating surface is critical. That is, the selection of an offset that maintains preform body portion 7 in contact with the inner surface over the longest possible interval while at the same time ensuring that the end portion 8 contacts the corresponding end surface of the cooling tube before the end portion 8 has the opportunity to reheat and deform under suction. In most cases, the correct size has never been established for given cycle time and preforms experience either some ovality problem or some gate stretching or some of both at an aggressive cycle time.

The remaining group of cooling tubes share the common trait that the shape and size of their inner mating surface either match or are larger than the corresponding outer shape of the corresponding and just-molded preform whereby an intimate fit cannot be provided. Such cooling tubes allow the preform to be transferred almost immediately to its final seated position, and therefore do not experience gate stretching. However, the preform body portion 7 will have only limited point contact with the inner mating surface, a condition that is exacerbated with continued cooling and shrinkage, and therefore there is relatively limited and non-uniform cooling that induces preform ovality.

It is desired to reduce the length of time it takes a preform to completely seat in the cooling tube for a given offset, and thereby minimize gate stretching. It is also desired to provide more flexibility in the selection of the offset of the cooling tube inner mating surface without consideration for the variations in preform 5 shape that inevitably occur as a function of the process parameters (e.g. changes in in-mold cooling time, packing, etc). It is further desired to provide for increasing the amount of offset that is applied to the inner mating surface of the cooling tube to further reduce preform ovality, while also avoiding gate stretching.

The use of surface treatments, such as with tetrafluoroethylene (TFE) polymer coatings to increase lubricity, applied to a metallic article is well known. A commonly recognized TFE polymer is polytetrafluoroethylene (PTFE) sold under the trademark TEFLON and manufactured by E.I. du Pont de Nemours & Co., Incorporated. PTFE coatings may be loosely applied to the surface of an article, but for lasting performance the PTFE is typically fused with the article substrate material. The latter process of fusing PTFE and similar polymers to a substrate material is generally known. A commonly cited coating that has found use on blow molds, tire molds, and many other Aluminum articles goes by the trademark of TUFRAM, marketed by General Magnaplate Corporation. The process for fusing PTFE polymer coating to an Aluminum mold substrate is generally described in U.S. Pat. No. 3,931,381, and includes the steps of converting, to a predetermined depth, an aluminium mold surface to aluminum oxide that is then impregnated with PTFE particles generally under one micron in size. The process causes the aluminum crystals at the surface to expand forming porous hydroscopic crystals that permanently interlock with the PTFE particles to form a continuous lubricating polymer surface.

Further, there are many other well-known self-lubricating materials that have use as surface treatments for Aluminum or with other substrate materials (ferrous and non-ferrous) for the common purpose of increasing lubricity. U.S. Pat. Nos. 5,325,732 and 6,447,704 further describe the methods for surface treating, and include a listing of many of the available self-lubricating materials as partially reproduced in Table 1. As described therein common plastic lubricants, otherwise known as polymeric coatings, include perhaloolefine, polyethylethylketone, homopolymers and copolymers of tetrachlorethylene, flouranated ethylene propylene, perfluoro alkoxyethylene, acrylics, vinylidene fluorides and amides, all of which may be applied by conventional coating and impregnation techniques. Further varieties of self-lubricating compounds include polymer composites and intercalated solid materials.

TABLE 1

| | |
|---|---|
| LECTROFLUOR | General Magnaplate Corporation, Linden, N.J. |
| HARDLUBE | Pioneer-Norelkote of Green Bay, Wis. |
| MAGNAPLATE | General Magnaplate Corporation, Linden, N.J. |
| NEDOX | General Magnaplate Corporation, Linden, N.J. |
| PEEK | Victrex USA Inc. of West Chester, Pa. |

A surface to be treated with TUFRAM or other such self-lubricating material may or may not need to be anodized prior to application of the coating, as the required porous surface may be inherent in the metal, otherwise such a surface may be provided by anodizing as is commonly known. Anodizing causes the formation of a shallow oxide layer on the surface of the article that has a wear-resistant, porous structure suitable for impregnating with a self-lubricating compound, as described hereinabove.

Alternatively, the wear-resistant, porous surface layer may be formed by applying an electrolytic layer of nickel or chromium. Chromium is particularly useful in this regard because of its hardness. Alternatively, a porous zinc phosphate layer may be bonded to the metal surface.

Alternatively, the wear-resistant, porous surface layer may also be provided by appropriate selection of metals from which to form the article. For example, sintered powdered metals having about 1% to 35% porosity are well known and can be utilized to provide a porous surface.

From the known methods for surface treating, it is noted that the manner in which the coating of the self-lubricating compound is applied may vary widely, but commonly ensure that the self-lubricating compound impregnates or extends into the pores of the porous surface layer. For example, the coating may be sprayed onto the surface layer, applied with a brush or roller, or the article may be immersed in a tank or vat of the self-lubricating compound. After application of the self-lubricating coating, the coated article should be allowed to stand for a length of time sufficient to dry or set the coating within the pores of the porous surface layer of the article. Baking at a moderate temperature, such as 90-150° Celsius for at least about one hour then fixes the coating.

Further, the known methods for surface treating may further include the step of contacting the impregnated surface with a shapable mixture of the self-lubricating compound, and hardening the resulting composite material.

U.S. Pat. No. 5,198,176 provides an example of a forming tube for the production of a heat-set thermoplastic container by a plug forming method. The mold forming tube includes a thin sleeve of TEFLON that reduces the incidence of sticking of the thermoplastic to the bottom side wall portions of the forming tube.

Commonly assigned U.S. Pat. No. 6,461,556 provides an example of a cooling pin for cooling the interior of just-molded preforms. The cooling pin comprises a central pin structure terminating in a head portion, a fluid channel passing through the central pin structure and terminating in an outlet in the head portion, and a plurality of fins positioned along the central pin structure that function to keep the cooling fluid in close proximity to the interior surface of the molded article. The fins may be formed from TEFLON.

U.S. Pat. No. 4,380,526 provides an example of a blow mold cavity for non-round bottles with a coating of heat insulative material, such as TEFLON, that improves slippage of the material on the coated surface and retards excessive heat transfer from the plastic thereby preventing premature setting of the material.

Given the foregoing, it is desired to improve the function of the intimate fit cooling tube to improve the conditioning of a preform retained therein while also substantially reducing, if not eliminating preform ovality and gate stretching. In particular, it is desired to reduce the length of time it takes a preform 5 to completely seat in a cooling tube for a given offset.

SUMMARY OF INVENTION

The cooling tube of the present invention has particular utility for retaining and effectively conditioning preforms such that objective preform quality is maintained from the injection mold. In particular, the cooling tube of the present invention substantially reduces or eliminates preform ovality and gate stretching problems by reducing the length of time it takes a preform to completely seat in the cooling tube for a given offset.

According to a first aspect of the invention, an apparatus is provided for receiving and conditioning a molded article. The apparatus comprising a cooling tube, the inner surface of the cooling tube providing a mating surface that substantially conforms in size and shape to the outer surface of the molded article. At least a portion of the mating surface is provided by a coating. The mating surface further includes an offset over at least a portion thereof. The mating surface provides, in use, an intimate fit to the molded article in contact therewith that substantially reduces or eliminates molded article ovality and gate stretching problems by reducing the length of time it takes the molded article to completely seat in the cooling tube. The apparatus has particular utility for receiving and conditioning preforms.

Preferably, the apparatus comprises a tube body and a cooling insert that is retained in an end of the tube body. The mating surface comprising an inner mating surface provided along an inside of the tube body that corresponds to a preform body portion and a mating surface provided on the cooling insert that corresponds to a preform end portion. The coating is preferably applied on a porous surface provided by an anodized shell on the tube body. Preferably, the coating provides the entire inner surface of the tube body, and the cooling insert mating surface does not include a coating. Preferably, the apparatus further includes a cooling means for cooling the preform retained therein and a suction passageway that extends through the mating surface for drawing the preform into the cooling tube. The tube body and the cooling tube are preferably made aluminum.

Preferably, the coating is a polymeric material, and in particular TUFRAM.

Alternatively, the coating may be provided in a pattern. Furthermore, the thickness of the coating may also be profiled along the length or around the circumference of the mating surface.

According to another aspect of the invention, an end-of-arm tool is provided for handling and conditioning a plurality of preforms. The end-of-arm tool comprising a carrier plate with an plurality of cooling tubes arranged and connected thereto. Each of the cooling tubes includes an inner surface that provides a mating surface that substantially conforms in size and shape to the outer surface of a preform. At least a portion of the mating surface is provided by a coating, the mating surface further including an offset over at least a portion thereof. The mating surface of each cooling tube provides, in use, an intimate fit to a preform in contact therewith that substantially reduces or eliminates preform ovality and gate stretching problems by reducing the length of time it takes the preform to completely seat in the cooling tube.

A further advantage provided by the cooling tube in accordance with present invention is a reduction of ejection force required to remove the preforms. The end-of-arm tool may therefore include a simplified ejection device. For many preforms it would be sufficient to simply blow the preforms from the cooling tubes by reversing the cooling tube suction means.

Other advantages of such coatings, preferably TUFRAM, are that they impart increased hardness, wear and permanent lubricity to the inner mating surface of the cooling tube. The preferred coating provides a hardness between Rc 40 and Rc 65 that further serves to protect the inner mating surface against scratches, blemishes, marks, and scoring.

BRIEF DESCRIPTION OF DRAWINGS

Exemplary embodiments of the present invention will now be described with reference to the accompanying drawings in which.

DETAILED DESCRIPTION

Figures 3A, 3B:
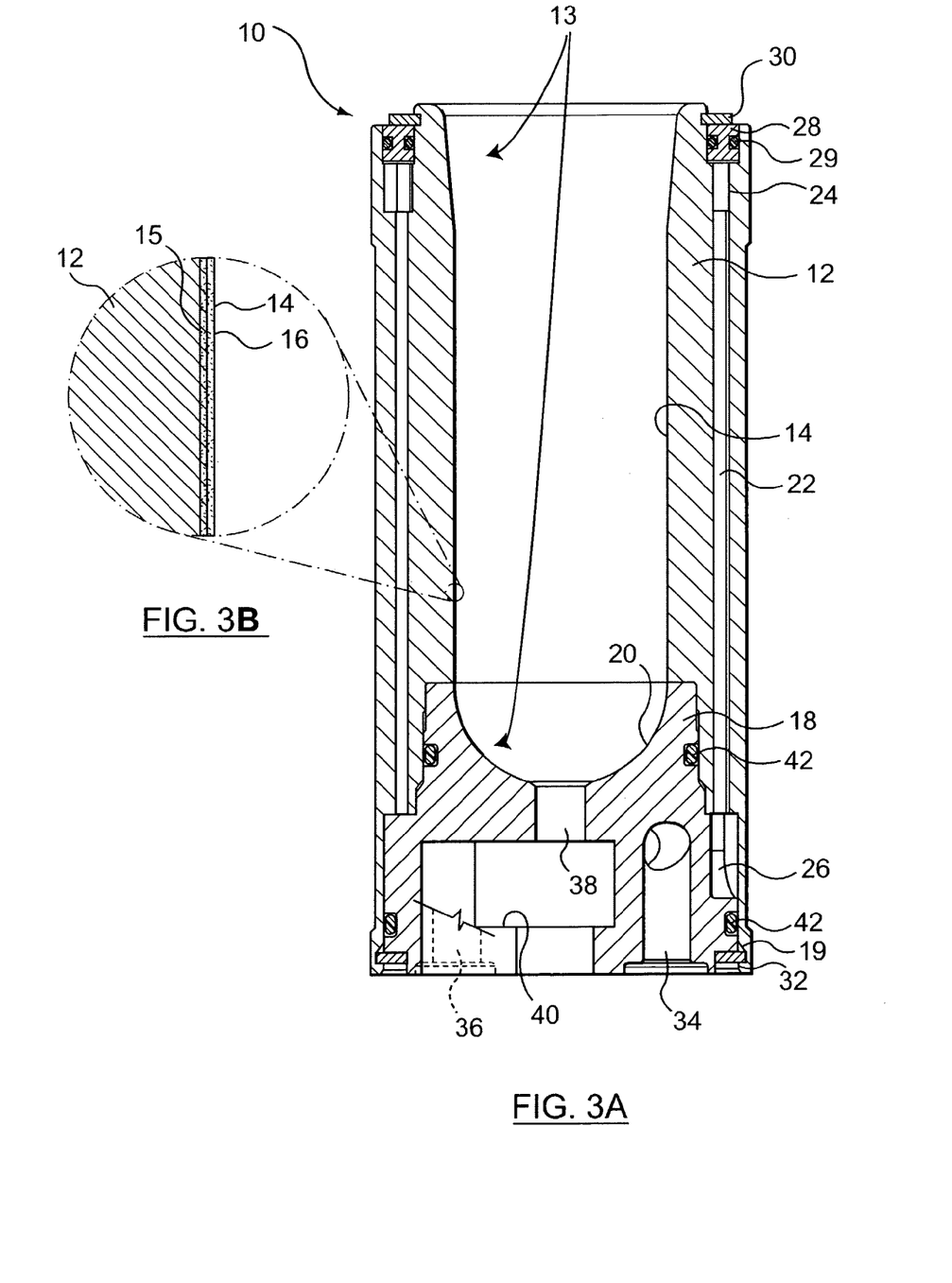
FIG. 3A illustrates a section view of a cooling tube in accordance with an embodiment of the invention.
FIG. 3B illustrates an exploded section view of a coated inner mating surface of a cooling tube of FIG. 3A.

A cooling tube 10 according to a preferred embodiment of the present invention is shown in FIGS. 3A and 3B. The cooling tube 10 includes a tube body 12 and a cooling insert 18 that is received in a corresponding pocket 19 provided in an end of the tube body 12. Alternatively, the cooling tube 10 may have a unitary structure without a cooling insert 18. The cooling tube 10 includes mating surface 13 that substantially conform in size and shape to the outer surface of the preform body portion 7 and end portion 9. The mating surface 13 further includes an interference offset over at least a portion thereof, typical of an intimate fit cooling tube. In the preferred embodiment the mating surface 13 comprises an inner mating surface 14 provided along the inside of the tube body 12 that corresponds to the preform body portion 7 and a mating surface 20 provided on the cooling insert 18 that corresponds to the preform end portion 8. The cooling tube 10 further includes a cooling means in order that the preform 5 retained therein is thermally conditioned to remove heat. The cooling means may be provided by a series of cooling channels 22 in the tube body 12, with the cooling channels 22 interconnected by collector channels 24 to form a cooling circuit. The collector channels 24 are provided near the open end of the cooling tube 10 and connect adjacent cooling channels 22. The collector channels 24 are enclosed by a sealing ring 28 that is held in place by a retaining clip 30. The sealing ring 28 includes suitable sealing means such as seals 29. The cooling channels 22 are interconnected at their opposite ends by a second set of collector channels 26 provided in the cooling insert 18. The cooling channel has an inlet and 34 an outlet port 36 formed in the cooling insert 18 that, in use, connect the cooling tube cooling circuit to a coolant source 100. The coolant source 100 is typically provided adjacent the robot 96, as shown in FIG. 1, and is to be connected into the carrier plate 98 within which there is provided a network of channels for connection with the cooling tube inlet 34 and outlet ports 36. Alternatively, the cooling tube 10 may be cooled through conductive heat transfer with a heat sink. The cooling tube 10 further includes a suction passageway 38 that, in use, connects to a suction source 99. The suction source 99 is typically provided adjacent the robot 96, as shown in FIG. 1, and is connected into the carrier plate 98 within which there is provided a network of channels for connection with the cooling tube suction passageway 38. The passageway 38 is preferably dimensioned to provide a clearance for the preform gate vestige 9 when, in use, the preform 5 is completely seated in the cooling tube 10 and thereby ensures that the preform dome-end portion 8 can engage the cooling insert mating surface 20. The cooling insert 18 is retained and sealed within the tube body 12 by a retaining clip 32 and seals 42 respectively. The seals 42 are arranged on either side of the collector channel 26. The tube body 12 and the cooling insert 18 are preferably made from Aluminum, although other materials with high thermal conductivity may also be suitable. The cooling tube 10 may be mounted to the surface of the carrier plate 98 by, for example, a clamp that acts on clamping surface 40 provided as a shoulder on the cooling insert 18. The clamp may be, for example, a cap screw, D-clamp, etc. The construction and operation of such a cooling tube 10, including a method for forming the cooling channels 22 by extrusion, is further described in commonly assigned U.S. patent application Ser. No. 10/321,940, as mentioned hereinbefore.

The cooling tube 10 is further characterized in that the tube body 12 includes a low friction coating 16 that provides at least a portion of the inner mating surface 14 thereon, as shown in FIG. 3B. The coating 16 may be applied in any pattern around the circumference and along the length of the tube body 12 inner mating surface. In a preferred embodiment the coating 16 provides the entire inner mating surface 14 of the tube body 12. The coating 16 provides a substantially reduced coefficient of friction along the inner mating surface 14. Those skilled in the art would appreciate that the surface finish along the inner mating surface 14, provided by the coating 16 according to the preferred embodiment, also has a profound effect on its coefficient of friction. In the preferred embodiment the coating 16 is provided by TUFRAM applied to the tube body 12 according to the methods described hereinbefore. Those skilled in the art would appreciate that there are many other suitable coating materials and methods for their application. In particular, but not exclusively, the coating material could be a self-lubricating material such as a polymeric coating, or a polymer composite, as described hereinbefore, or a suitably polished finish that may be provided on a metallic, coating (e.g., chrome, Ti, etc.). In accordance with preferred embodiment, the coating 16 is preferably applied onto the tube body 12 after it has been anodized. The anodizing process provides a porous shell 15 of an aluminum oxide substrate material that is quite suitable for receiving the coating 16. With a TUFRAM coating, the coefficient of friction of the inner mating surface 14 may be lowered to as little as 0.05. A relative comparison between a cooling tube 10 with and without a coating 16, for the same intimate fit relationship between the inner mating surface 14 and a preform body 7, that is the same offset, the reduced friction provided on the coated cooling tube 10 provided for a significant reduction in the time period required to completely seat the preform 5.

As shown in FIG. 3B, the coated tube body 12 includes a dispersion of the coating material that has become impregnated within the substrate material of the shell 15 to a shallow depth. Furthermore, the coating 16 preferably extends beyond the impregnated shell 15 to a shallow depth. Many polymeric coating materials have relatively poor thermal conductivity. Accordingly, the coating 16 is applied in a thin layer so as to not significantly impact the heat transfer between the preform 5 and the tube body 12 substrate material. In the preferred embodiment, the thickness of the coating 16 is kept between about 0.01 and 0.1 mm so as to avoid significant impact on heat transfer. Alternatively, the thickness of the coating 16 may also be profiled along the length or the circumference of the inner mating surface 14 in accordance with the requirements dictated by any specific shape of the preform 5. Alternatively, the coating 16 may be required only in the entry area along the inner mating surface 14. In the preferred embodiment of the invention, as shown in FIGS. 3A & 3B the mating surface 20 of the cooling insert 18 is not provided with a coating because contact is not made between the preform end portion 8 and the mating surface 20 until the preform 5 is completely seated.

The mode in which the cooling tube 10 operates on a preform 5 transferred therein is believed to involve the circumferential preloading, that is diametric squeezing and hence diametric adjustment to the relatively undersized and correspondingly contoured cooling tube inner mating surface 14, of the preform body portion 7 as it is rapidly seated into the cooling tube 10 under momentum imparted from its ejection from the molding cavity of the second mold half 80. The preload dissipates over time as the preform cools and shrinks. The diametric adjustment of the preform is a function of its flexibility, and hence dependent on the latent molding heat retained therein. Hence, the preform may also experience a final component of shrink fit into the completely seated position in response to continued cooling and suction provided therein, albeit with reduced stiction. By contrast, the typical intimate fit cooling tube, as described in U.S. Pat. No. 4,729,732, with its relatively high inner mating surface friction, does not provide for significant preform preloading. Hence the mode by which the preform enters the tube is almost exclusively a function of shrink fit in response to cooling and hence becomes completely seated after a relatively long period of time, typically several seconds, and as described hereinbefore contributes to gate stretching.

Furthermore, the reduction of the coefficient of friction along the inner mating surface 14 provides the opportunity to increase the offset beyond previously established limits, that had been set to avoid the gate stretching problem, and therefore further reduce or eliminate the incidence of preform ovality. The reduction in ovality relates to the fact that as the preform 5 cools, it shrinks, and hence a larger preload will take longer to dissipate and hence the preform body portion 7 will remain in contact with the inner mating surface 14 for a longer period of time.

Figure 3C:
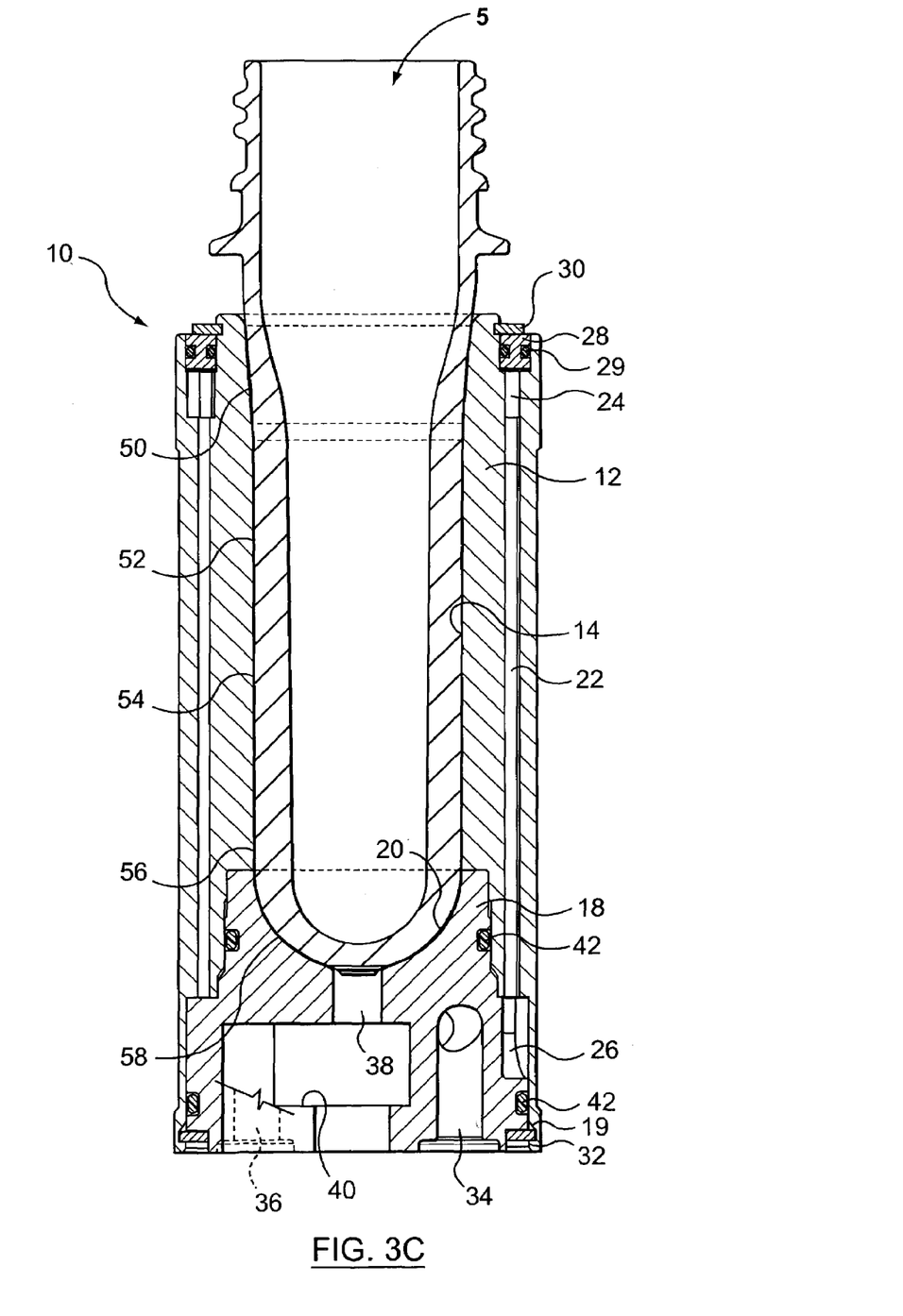
FIG. 3C illustrates a section view of a cooling tube of FIG. 3A, the cooling tube including the exemplary preform of FIG. 2 completely seated therein.

With reference to FIG. 3C a preform 5 is shown after it has attained a completely seated position within the cooling tube 10. Those skilled in the art will appreciate the selection of an offset to be applied to the inner mating surface 14 varies as a function of the shape of the preform 5 and the related injection molding process. For an exemplary preform 5, the interference offsets are shown at various locations 50-58 along the preform body portion 7. For example, the offset at a first location 50 is substantially zero, and thereby accommodates the vertical shrinkage of the preform 5. Further along the length of the preform 5, the locations 52, 54, and 56 include an offset that gradually diminishes in the direction of the preform 5 end portion 8. The offset at the second location 52 is 0.09 mm, that tapers evenly to 0.012 mm at the fourth location 56. Preferably, the mating surface 20 of the cooling insert 18, location 58, is offset by whatever amount may be required to blend the mating surface 20 into the inner mating surface 14. This avoids a step where the mating surface 20 meets the inner mating surface 14 to prevent a witness line from being formed on the preform 5.

Figure 4:
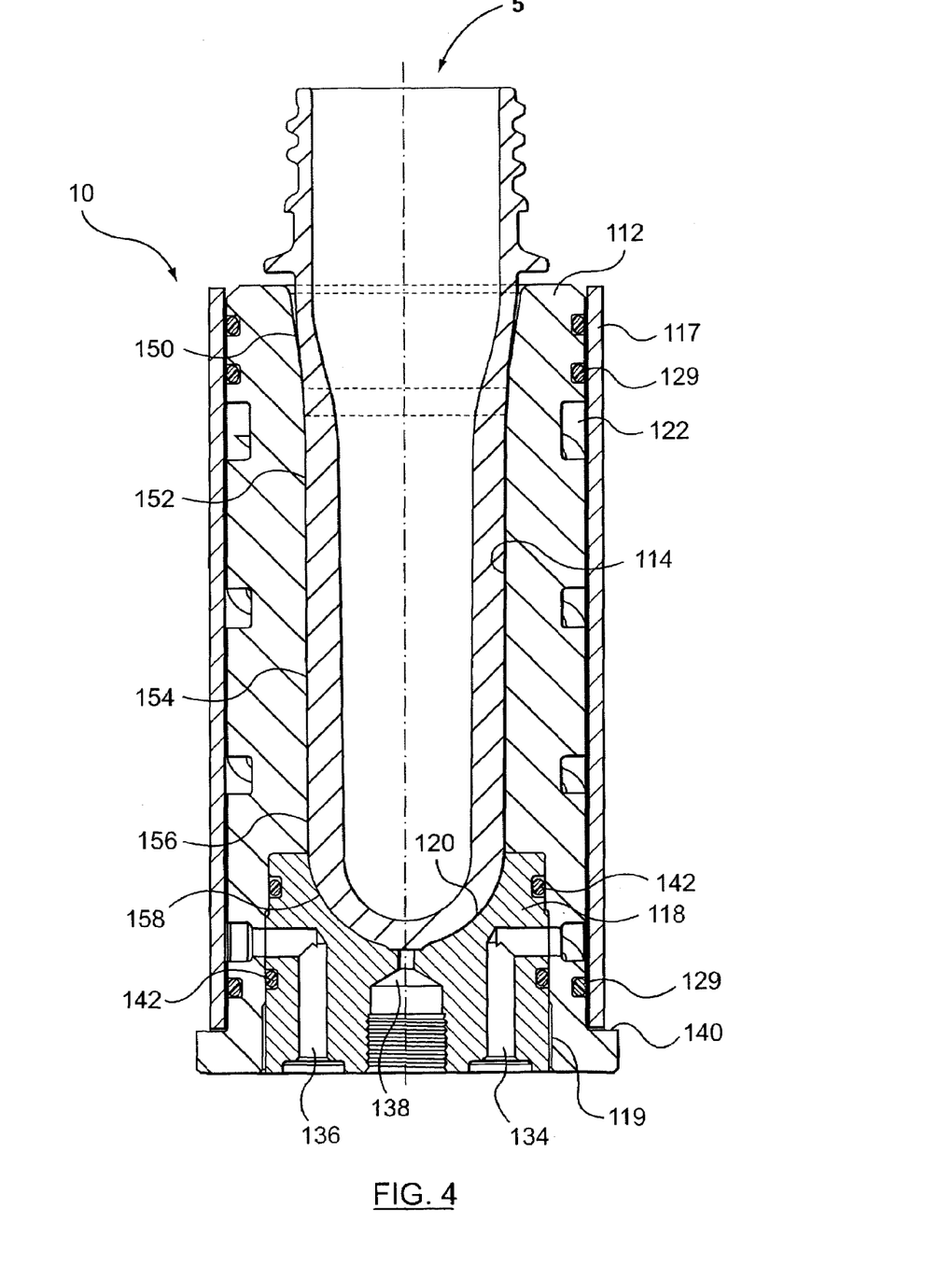
FIG. 4 illustrates a section view of a cooling tube in accordance with an alternative embodiment of the invention with the exemplary preform of FIG. 2 completely seated therein.

In alternative embodiment of the present invention, as shown in FIG. 4, the cooling tube 110 comprises a tube body 112 and a cooling insert 118 retained in a pocket 119 provided in a first end of the tube body 112. The tube body 112 and the cooling insert 118 include mating surfaces 114 and 120 for contacting a preform 5. The inner mating surface 114 of tube body 112 further includes a coating (not shown). The configuration of the inner mating surface 114 of the tube body 112 and the cooling insert mating surface 120 is consistent with the description provided hereinbefore, including the relative offsets at locations 150-158. The cooling tube 110 further includes an integrally formed cooling means provided by cooling channels 122 that are preferably arranged as an interconnected double spiral to provide a cooling circuit with inlet and outlet ports 134 and 136 of the cooling insert 118. The cooling channel 122 are enclosed by a sleeve 117 which fits around the tube body 112 and are sealed therewith by seals 129. The cooling tube 110 further includes a suction passageway 138 through which, in use, suction can be applied. In use, the cooling tube cooling circuit and vacuum passageway 138 are connected to the coolant source 100 and suction source 99, as described hereinbefore. The cooling tube 110 may be mounted to the surface of the carrier plate 98 by use of clamps acting on clamping surface 140. The clamping surface 140 is provided on a flange integrally formed at the base of the tube body 12.

Thus, what has been described is an improved intimate fit cooling tube with a coating on at least a portion of the preform mating surface to substantially reduces or eliminates preform ovality and gate stretching problems.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. An apparatus for receiving and conditioning a just-molded molded article comprising:
    a cooling tube with an inner mating surface that substantially conforms in shape to an outer shape of the molded article, said inner mating surface being inwardly offset to cause the just-molded molded article to not immediately fit completely in the cooling tube, and
    a low friction non-uniform coating applied along at least a portion of the inner mating surface, the low friction non-uniform coating configured to promote a rapid intimate fitting of the just-molded molded article into the cooling tube and maintain the intimate fit as the molded article shrinks with cooling.

2. The apparatus of claim 1, wherein the molded article comprises a preform and the inner mating surface is configured for receiving a portion thereof.

3. The apparatus of claim 1, wherein the low friction non-uniform coating has a thickness of between 0.01 and 0.1 mm.

4. The apparatus of claim 3, wherein a thickness of the low friction non-uniform coating is profiled along a length of the inner mating surface.

5. The apparatus of claim 3, wherein a thickness of the low friction non-uniform coating is profiled around a circumference of the inner mating surface.

6. The apparatus of claim 2, further comprising a cooling means wherein, in use, the cooling means removes heat from the preform.

7. The apparatus of claim 6, wherein the cooling means is provided, in use, by conductive heat transfer with a heat sink provided on a carrier plate.

8. The apparatus of claim 6, wherein the cooling tube further includes a suction passageway provided through the inner mating surface that, in use, connects to a suction source.

9. The apparatus of claim 8, wherein the cooling tube comprises a tube body and a cooling insert retained in an end of the tube body, the inner mating surface comprising (i) a first inner mating surface provided along an inside of the tube body that corresponds to a preform body portion and (ii) an end mating surface provided on the cooling insert that corresponds to a preform end portion.

10. The apparatus of claim 9, wherein the low friction non-uniform coating covers less than the entire inner mating surface of the tube body.

11. The apparatus of claim 10, wherein the low friction non-uniform coating is applied onto the inner mating surface of the cooling insert.

12. The apparatus of claim 10, wherein the low friction non-uniform coating is applied onto an anodized shell of the tube body.

13. The apparatus of claim 9, wherein the cooling means is provided by a series of interconnected cooling channels provided on the tube body.

14. The apparatus of claim 13, further comprising an inlet and an outlet port formed in the cooling insert that, in use, connect the tube body to a coolant source.

15. The apparatus of claim 14, wherein a passageway is provided in the cooling insert, and extends through the inner mating surface.

16. The apparatus of claim 1, wherein the cooling tube comprises a highly thermally conductive material.

17. The apparatus of claim 16, wherein the cooling tube comprises Aluminum.

18. The apparatus of claim 16, wherein cooling tube comprises a sintered powdered body.

19. The apparatus of claim 1, wherein the low friction non-uniform coating comprises a self-lubricating material.

20. The apparatus of claim 19, wherein the low friction non-uniform coating comprises a polymeric material.

21. The apparatus of claim 20, wherein the low friction non-uniform coating is chosen from a group consisting of:
polytetrafluoroethylene, tetrafluoroethylene, perhaloolefine, polyethylethylketone, homopolymers and copolymers of tetrachlorethylene, flouranated ethylene propylene, perofluoro alkoxyethylene, acrylics, vinylidene fluorides and amides.

22. The apparatus of claim 1, wherein the low friction non-uniform coating comprises a polished finish.

23. The apparatus of claim 22, wherein the low friction non-uniform coating is applied onto a metallic layer that has been deposited onto a cooling tube substrate material.

24. An end-of-arm tool for handling and conditioning a plurality of just-molded preforms comprising:
a carrier plate with a plurality of cooling tubes arranged and connected thereto, each of the cooling tubes including:
an inner mating surface that substantially conforms in shape to an outer surface of one of the plurality of just-molded preforms, said mating surface being inwardly offset to cause the just-molded molded article to not immediately fit completely in the cooling tube,
a low friction non-uniform coating applied along at least a portion of the inner mating surface, the low friction non-uniform coating configured to promote a rapid intimate fitting of the one of the plurality of just-molded preforms into the cooling tube and maintain the intimate fit as the one of the plurality of just-molded preforms shrinks with cooling.

25. The end-of-arm tool of claim 24, wherein each of the plurality of cooling tubes comprises a tube body and a cooling insert retained in an end of the tube body, the inner mating surface comprising (i) a first inner mating surface provided along an inside of the tube body that corresponds to a preform body portion and (ii) an end mating surface provided on the cooling insert that corresponds to a preform end portion.

26. The end-of-arm tool of claim 25, wherein the low friction non-uniform coating is applied over an entire inner surface of the tube body.

27. The end-of-arm tool of claim 25, wherein the cooling tube further includes a cooling means provided by a series of interconnected cooling channels on the tube body.

28. The end-of-arm tool of claim 27, wherein the cooling insert further comprises an inlet and an outlet port formed in the cooling insert that, in use, connect the tube body to a coolant source through a network of channels provided in the carrier plate.

29. The end-of-arm tool of claim 28, wherein the cooling insert further includes a passageway that extends through the inner mating surface, in use, the passageway connects the cooling tube to a suction source through a network of channels provided in the carrier plate.

30. The end-of-arm tool of claim 25, wherein the tube body and the cooling insert are made from a highly thermally conductive material.

31. The end-of-arm tool of claim 30, wherein the tube body and the cooling insert are made from Aluminum.

32. The end-of-arm tool of claim 24, wherein the coating comprises a self-lubricating material.

33. The end-of-arm tool of claim 32, wherein the low friction non-uniform coating comprises polymeric material.

34. The end-of-arm tool of claim 33, wherein the low friction non-uniform coating is chosen from a group consisting of:
polytetrafluoroethylene, tetrafluoroethylene, perhaloolefine, polyethylethylketone, homopolymers and copolymers of tetrachlorethylene, flouranated ethylene propylene, perofluoro alkoxyethylene, acrylics, vinylidene fluorides and amides.

35. The end-of-arm tool of claim 24, wherein the low friction non-uniform coating is provided by a polished finish.

36. The end-of-arm tool of claim 35, wherein the low friction non-uniform coating is applied onto a metallic layer that has been deposited onto a cooling tube substrate material.

37. The apparatus of claim 1, wherein the low friction non-uniform coating extends inward from the inner mating surface inward offset.

38. The apparatus of claim 1, wherein the mating surface inward offset varies throughout a length of the inner mating surface.

39. The end-of-arm tool of claim 24, wherein the low friction non-uniform coating extends inward from the inner mating surface inward offset.

40. The end-of-arm tool of claim 24, wherein the mating surface inward offset varies throughout a length of the inner mating surface.

41. The apparatus of claim 1, wherein the low friction non-uniform coating is applied at an entry area of the cooling tube.

42. The apparatus of claim 1, wherein the low friction non-uniform coating is applied along a length of the cooling tube starting at an entry area and stopping before an end portion of the cooling tube.

43. The end-of-arm tool of claim 1, wherein the low friction non-uniform coating has a thickness between 0.01 and 0.1 mm.

44. The end-of-arm tool of claim 24, wherein the low friction non-uniform coating is applied at an entry area of the cooling tube.

45. The end-of-arm tool of claim 24, wherein the low friction non-uniform coating is applied at along a length of the cooling tube starting at an entry area and stopping before an end portion of the cooling tube.

* * * * *